(12) United States Patent
Subramanyam

(10) Patent No.: US 8,132,153 B2
(45) Date of Patent: Mar. 6, 2012

(54) QUALITY MANAGEMENT FRAMEWORK FOR A SOFTWARE LIFECYCLE

(75) Inventor: V. Subramanyam, Bangalore (IN)

(73) Assignee: Wipro Limited, Bangalore, Karnataka (IN)

( * ) Notice: Subject to any disclaimer, the term of this patent is extended or adjusted under 35 U.S.C. 154(b) by 1336 days.

(21) Appl. No.: 11/746,076

(22) Filed: May 9, 2007

(65) Prior Publication Data
US 2008/0282228 A1 Nov. 13, 2008

(51) Int. Cl.
*G06F 9/45* (2006.01)
(52) U.S. Cl. ...................................... 717/121
(58) Field of Classification Search .................. 717/121
See application file for complete search history.

(56) References Cited

U.S. PATENT DOCUMENTS

| | | | | |
|---|---|---|---|---|
| 6,539,396 B1 * | 3/2003 | Bowman-Amuah | ......... | 707/769 |
| 6,606,660 B1 * | 8/2003 | Bowman-Amuah | ......... | 709/227 |
| 7,596,778 B2 * | 9/2009 | Kolawa et al. | ......... | 717/126 |
| 7,937,281 B2 * | 5/2011 | Miller et al. | ......... | 705/7.11 |
| 2002/0161764 A1 * | 10/2002 | Sharo | ......... | 707/7 |

* cited by examiner

*Primary Examiner* — John Chavis
(74) *Attorney, Agent, or Firm* — Prakash Nama; Global IP Services, PLLC

(57) ABSTRACT

A quality management framework (hereinafter referred as "framework") for a software project lifecycle is provided. The framework enables generation of at least one software program while ensuring compliances with at least one standard. The plurality of items of the library includes tool an organization chart depository, a policy depository, a procedure depository, a life cycle model depository, a guideline depository, a template depository, a process asset depository, a workflow diagram depository and a checklist depository. Each of the items of the library is configured to be updated and accessed. The life cycle model depository of the library is configured to include a modular interface that enables handling of multiple lifecycle (V-model, waterfall model, iterative model etc.) models. The framework is configured to allow access the library.

9 Claims, 22 Drawing Sheets

FIG. 2

| ORG CHART | POLICIES | PROCEDURES | TEMPLATES | CHECKLISTS | LIFE CYCLE MODELS | GUIDELINES | PDS | PIP | WORKFLOWS | PROCESS ASSETS | NAVIGATOR |

Audit

PROCEDURES

Objective

This process aims at defining all activities and related aspects for planning and executing process audits for the IS organization and supporting groups. The primary responsibility of executing this process lies with the SPEG & Process Compliance group, yet they too are subject to audits for their processes.

Special Conditions

NONE

Entry Criteria

>> Start of the calendar year for Audit Planning

>> Planned start scheduled date for process audit for a new audit cycle

Roles

>> Senior Manager (SEPG & Process Compliance)

The Senior Manager (SPEG & Process Compliance) is responsible to review, communicate and approve the audit plan, in case of escalation for Non cloure of NC, Senior Manager initiates necessary interaction with peers of relevant teams and groups.

>> Program Manager (SEPG & Process Compliance)

The Program Manager (SEPG & Process Compliance) has the core responsibility of executing this process, and involved in the process of

FIG. 6

QUALITY MANAGEMENT FRAMEWORK FOR A SOFTWARE LIFECYCLE

TECHNICAL FIELD OF THE INVENTION

The present invention relates to project management, and more particularly relates to a quality management framework for a software lifecycle.

BACKGROUND OF THE INVENTION

In the current business environment, effective project management is a key factor in the success of many enterprises. Therefore, today's IT organizations have become increasingly concerned about effective project management. Accordingly, IT organizations typically strive to achieve effective project management by implementing a full life cycle project management solution, wherein each project in an IT organization's portfolio is created and developed according to a comprehensive lifecycle process.

In general, to be considered a comprehensive project life cycle management solution that would enable an IT organization to realize the above goals and to increase project success rate, a software lifecycle management tool must, at a minimum, enable to perform the following five functions. First, the software lifecycle management tool must enable the IT organizations to perform executive monitoring and control of its projects. Second, the software lifecycle management tool must enable the IT organization to utilize current industry knowledge and best-practices in managing a project. Third, the software lifecycle management tool must enable the IT organizations to have a more detailed view capability to identify problems as early as feasible in each project's lifecycle. Fourth, the software lifecycle management tool must enable the IT organizations to effectively balance the lifecycle process. Finally, the software lifecycle management tool must enable the IT organization to continually strive to reduce overall time to progress through the project lifecycle process.

Compliance with internal project management systems and policies is rarely sufficient to meet the demands of the marketplace. In today's business environment, compliance with external standards, quality assurance programs and protocols, must often be demonstrated to customers, potential customers and entities that create and certify compliance with the standards. In some cases compliance with multiple standards and protocols, such as ISO, CMMI, six-sigma, and so on must be demonstrated in connection with a single project.

There are a number of software lifecycle management tools well known in the art that may be used by an IT organization for project lifecycle management. Generally prior art solutions do not provide technique that enables an IT organization to deliver projects on-time, within budget and a desired quality.

SUMMARY OF INVENTION

According to an aspect of the present subject matter, there is provided a quality management framework (hereinafter referred as "framework") for a software project lifecycle. The plurality of items of the library includes an organization chart depository, a policy depository, a procedure depository, a life cycle model depository, a guideline depository, a template depository, a process asset depository, a workflow diagram depository and a checklist depository. Each of the items of the library is configured to be updated and accessed. Various items of the library are in accordance with at least one external standard (e.g., CMMI, ISO etc), for which the software is desired to be compliant. The life cycle model depository of the library is configured to include a modular interface that enables handling of multiple lifecycle (V-model, waterfall model, iterative model etc.) models. The framework is provided for allowing access to the library.

BRIEF DESCRIPTION OF THE DRAWINGS

Embodiments of the invention will now be described, by way of example only, with reference to the accompanying drawings in which:

FIG. 2 shows the system of FIG. 1 in accordance with the invention;

FIGS. 3-20 shows a library and its items in accordance with the invention; and

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
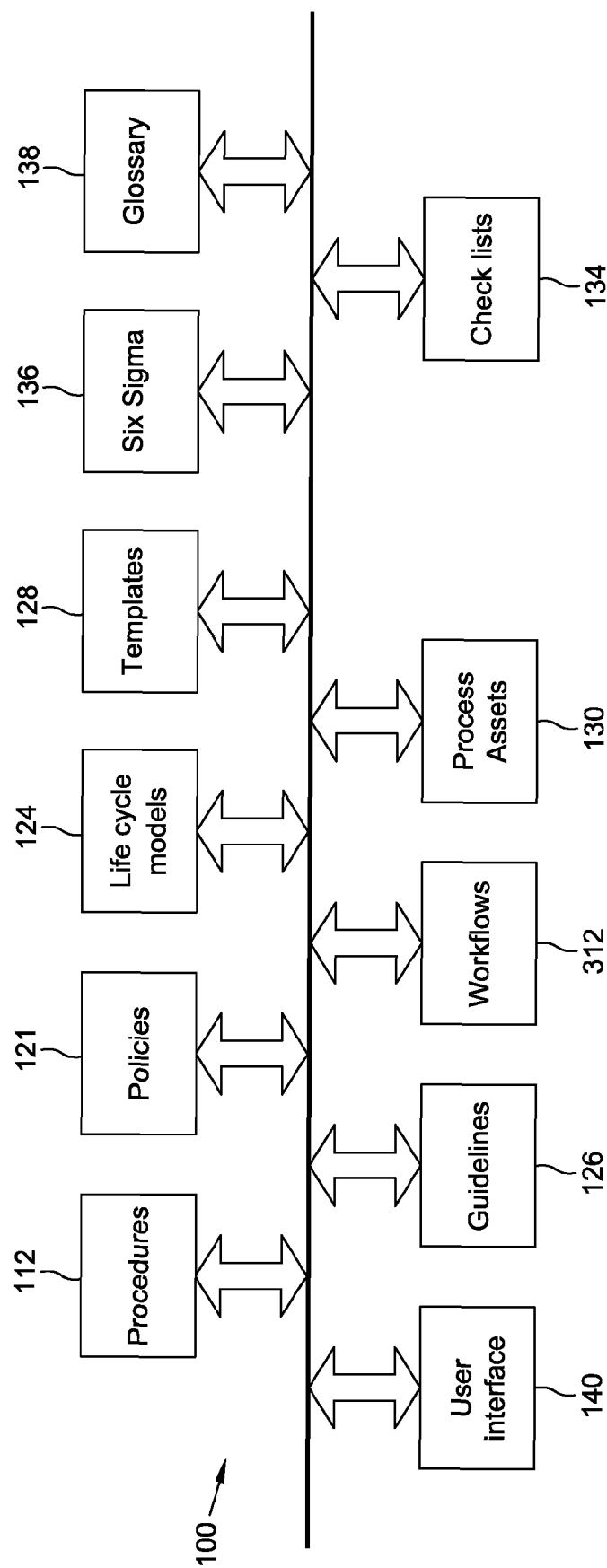
FIG. 1 shows a system in accordance with the invention.

FIG. 1 shows a block diagram of a quality management framework 100 in accordance with the present subject matter. The framework 100 includes a library. The framework 100 is configured to allow access to the library of the framework. The library has a plurality of items, which items include a policy depository 121, a procedure depository 122, a life cycle model depository 124, a guideline depository 126, a template depository 128, a process asset depository 130, a workflow diagram depository 132 and a checklist depository 134. Each of the items of the library is configured to be updated and accessed. Various items of the library are in accordance with at least one external standard (e.g., CMMI, ISO etc), for which the software is desired to be compliant. The life cycle model depository 124 of the library 120 is configured to include a modular interface that enables handling of multiple lifecycle (V-model, waterfall model, iterative model etc.) models. The library further includes tools for six-sigma tool 136 and glossary depository 138.

Figure 2:
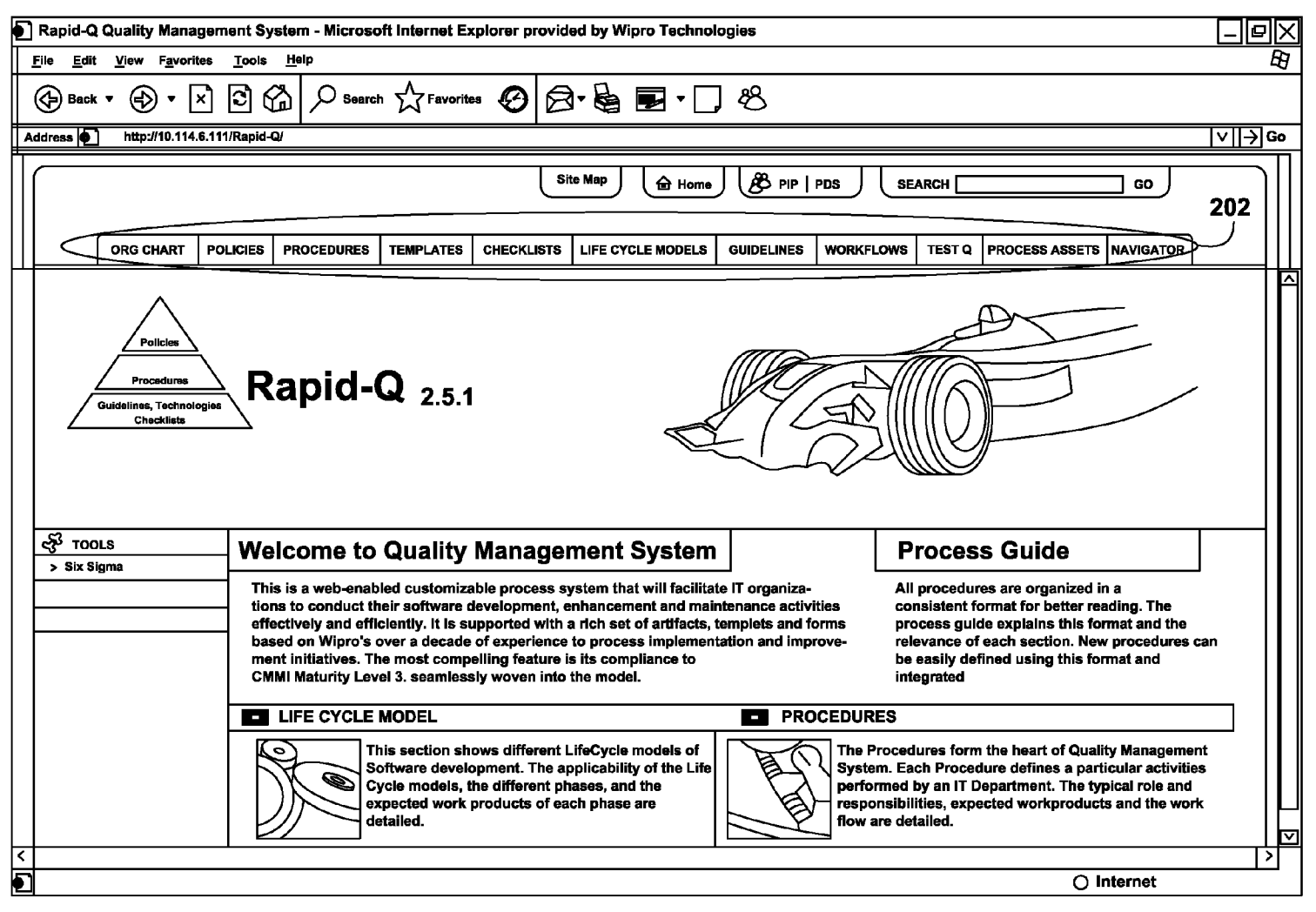

FIG. 2 shows the framework in more detail in accordance with the present subject matter. Block 202 shows items of the library.

Figure 3:
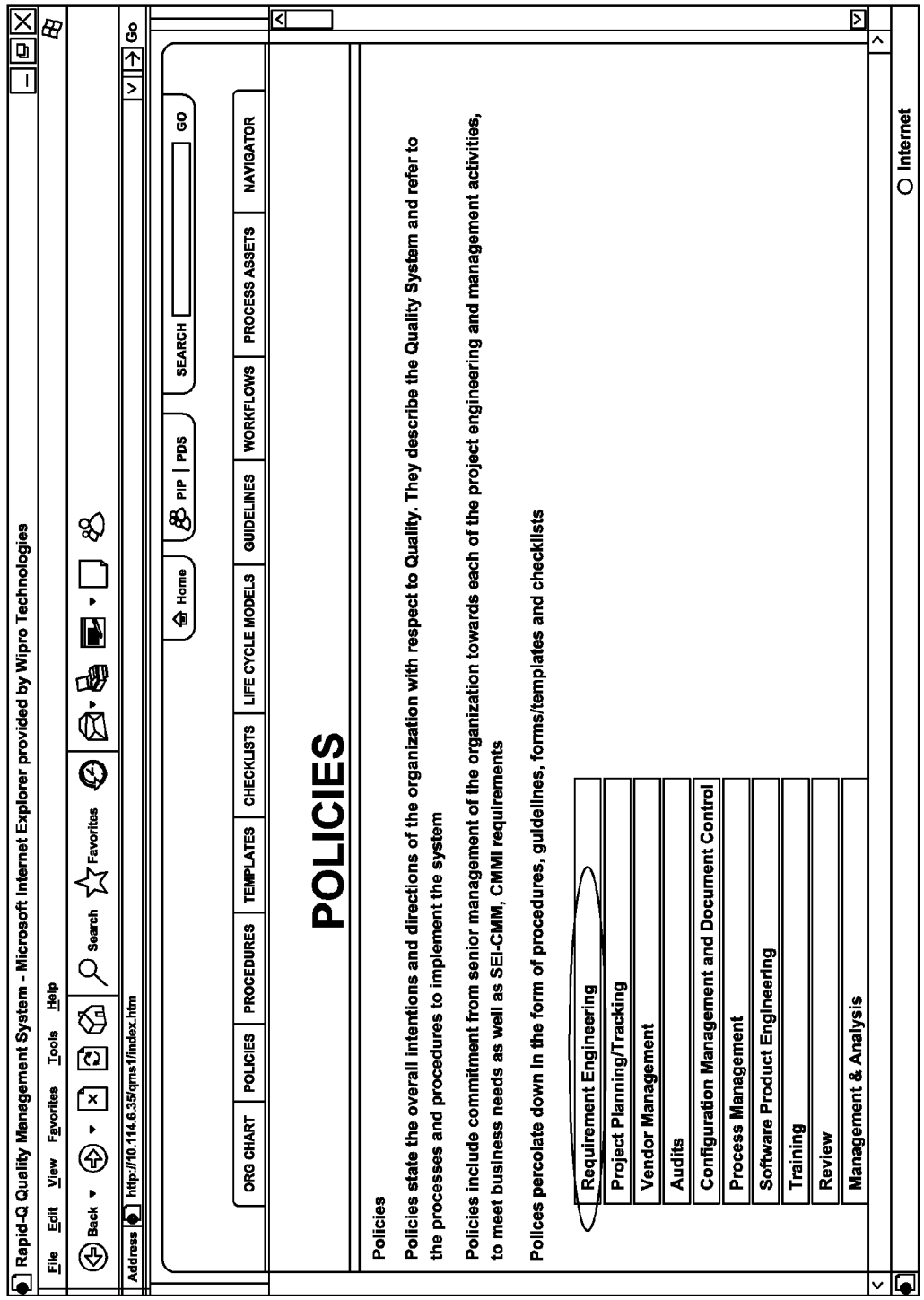
Figure 4:
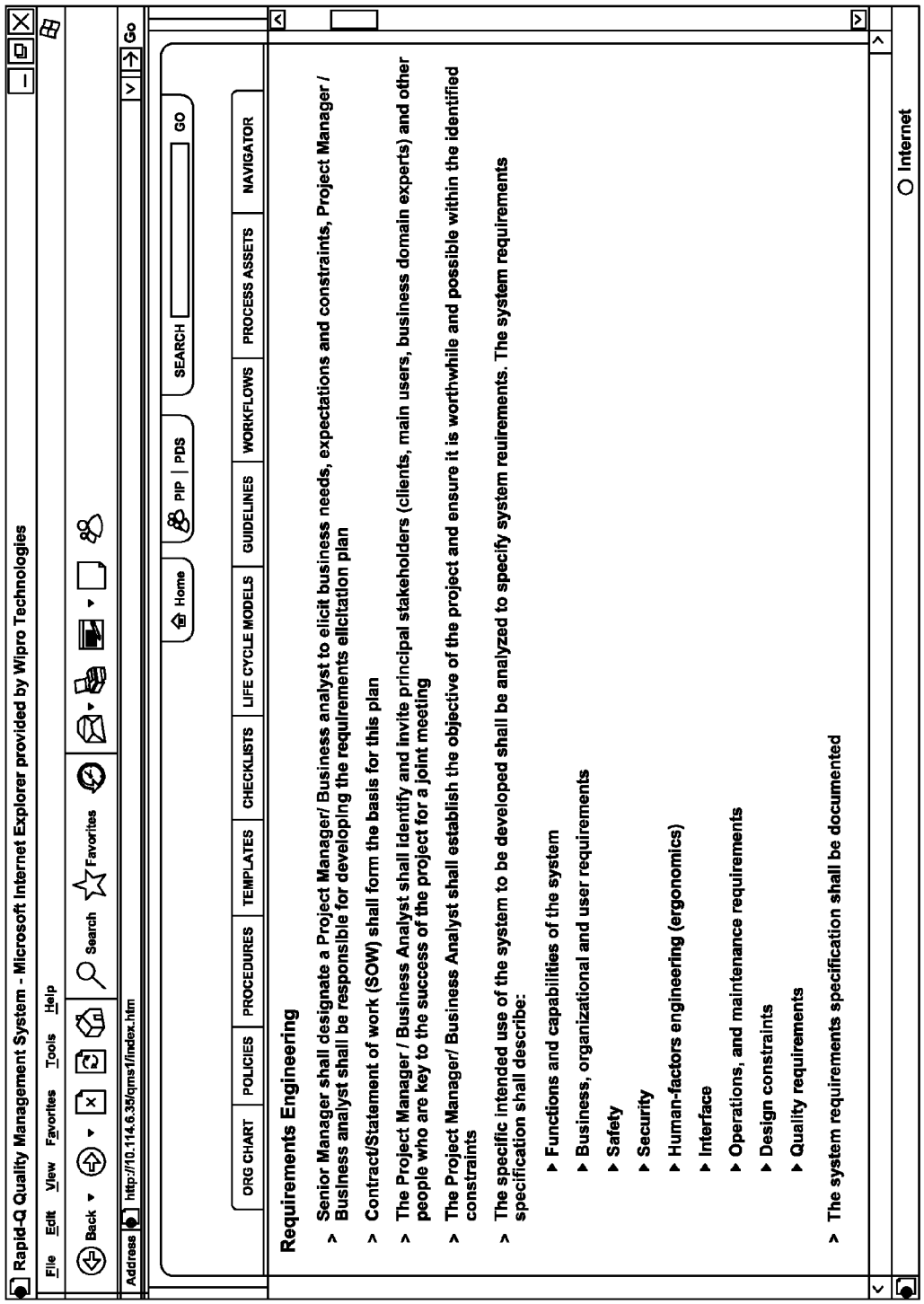

FIG. 3 shows the policy depository 121 in more details. The policy depository 121 may include a plurality of items, e.g. requirement engineering, project planning/tracking, vendor management, audits, configuration management and document control, process management, software product engineering, training, review etc. FIG. 4 shows an example of one of the item of the policy depository, namely, requirement engineering.

Figure 5:
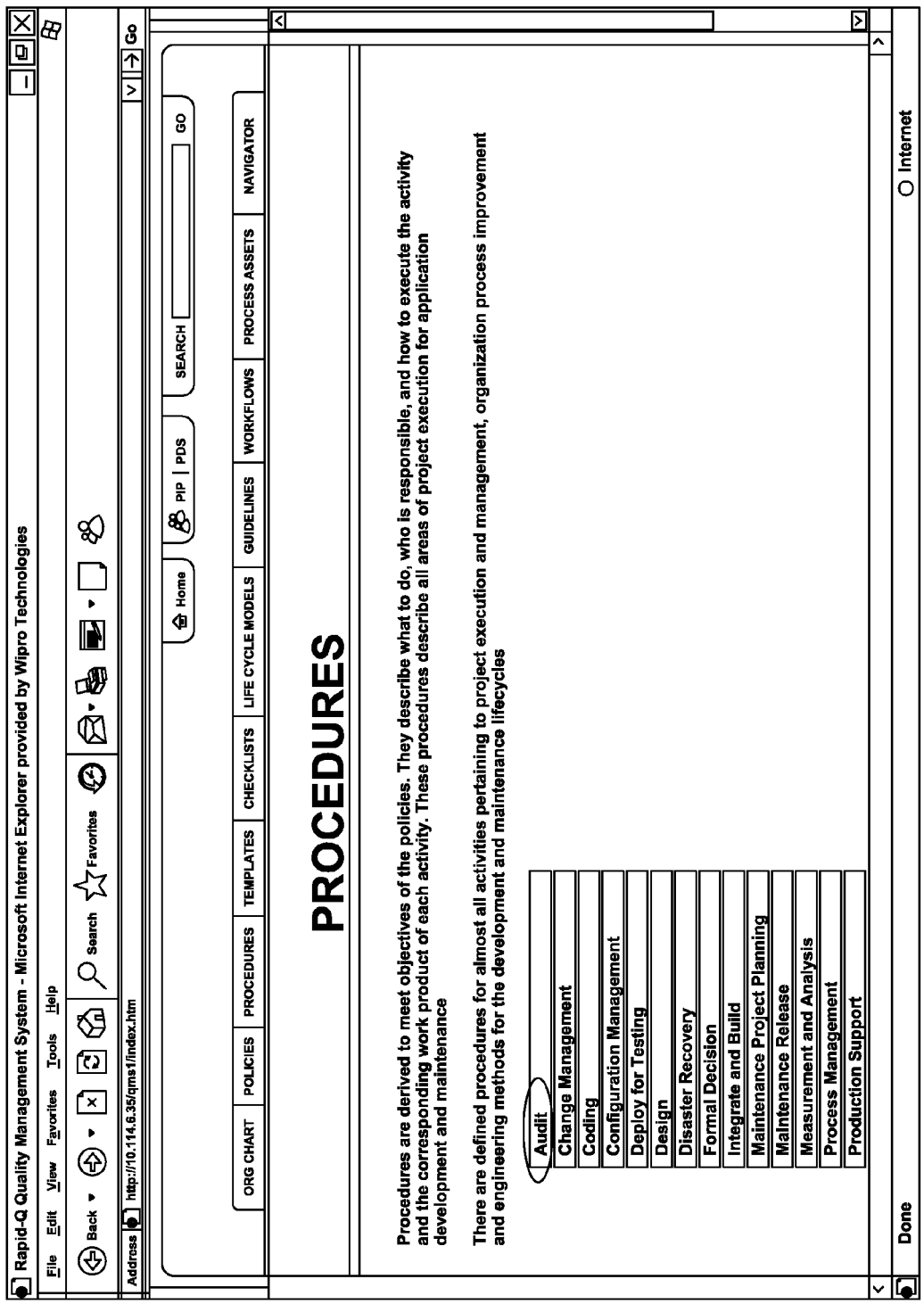
Figure 7:
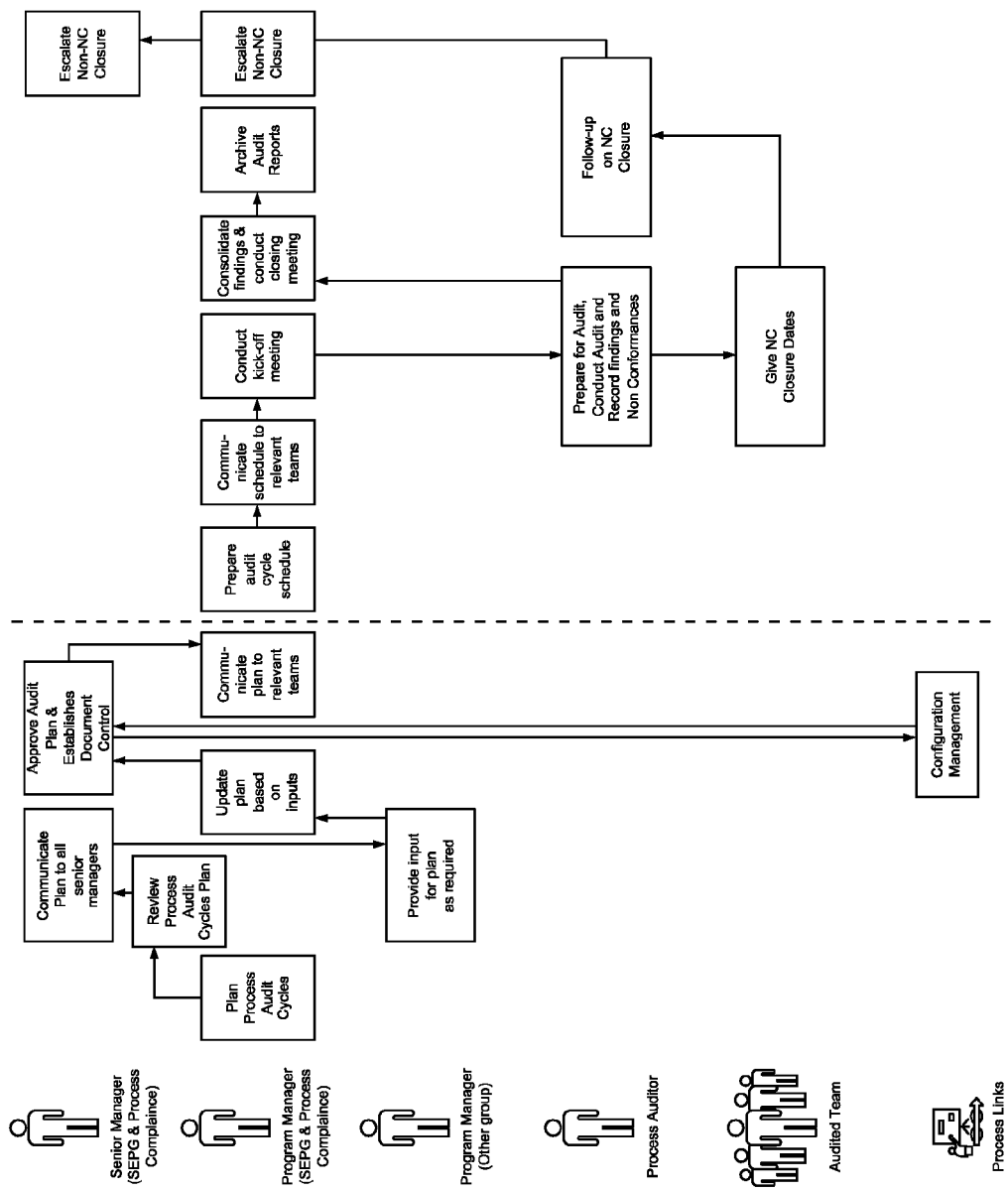

FIG. 5 shows the procedure depository 122 in more details. The procedure depository 122 includes items that described the procedures. These procedures may be created to meet the objectives of the policies listed in the policy depository. The items of the policy depository 121 and procedure depository 122 may be coupled one another to obtain inputs or to provide outputs. The items of the procedure depository 122 provide steps that are required to be followed during the lifecycle of the project. The procedure depository 122 may include a plurality of items, e.g., audit, change management, coding, configuration management, deploy for testing, design, disaster recovery, formal decision, integrate and build, maintenance project planning, measurement and analysis, process management, production support. FIG. 6 shows an example of the item audit of the procedure depository. Further the procedure depository is configured for generating a swim-lane diagram of a project, one such diagram is shown in FIG. 7.

Figure 8:
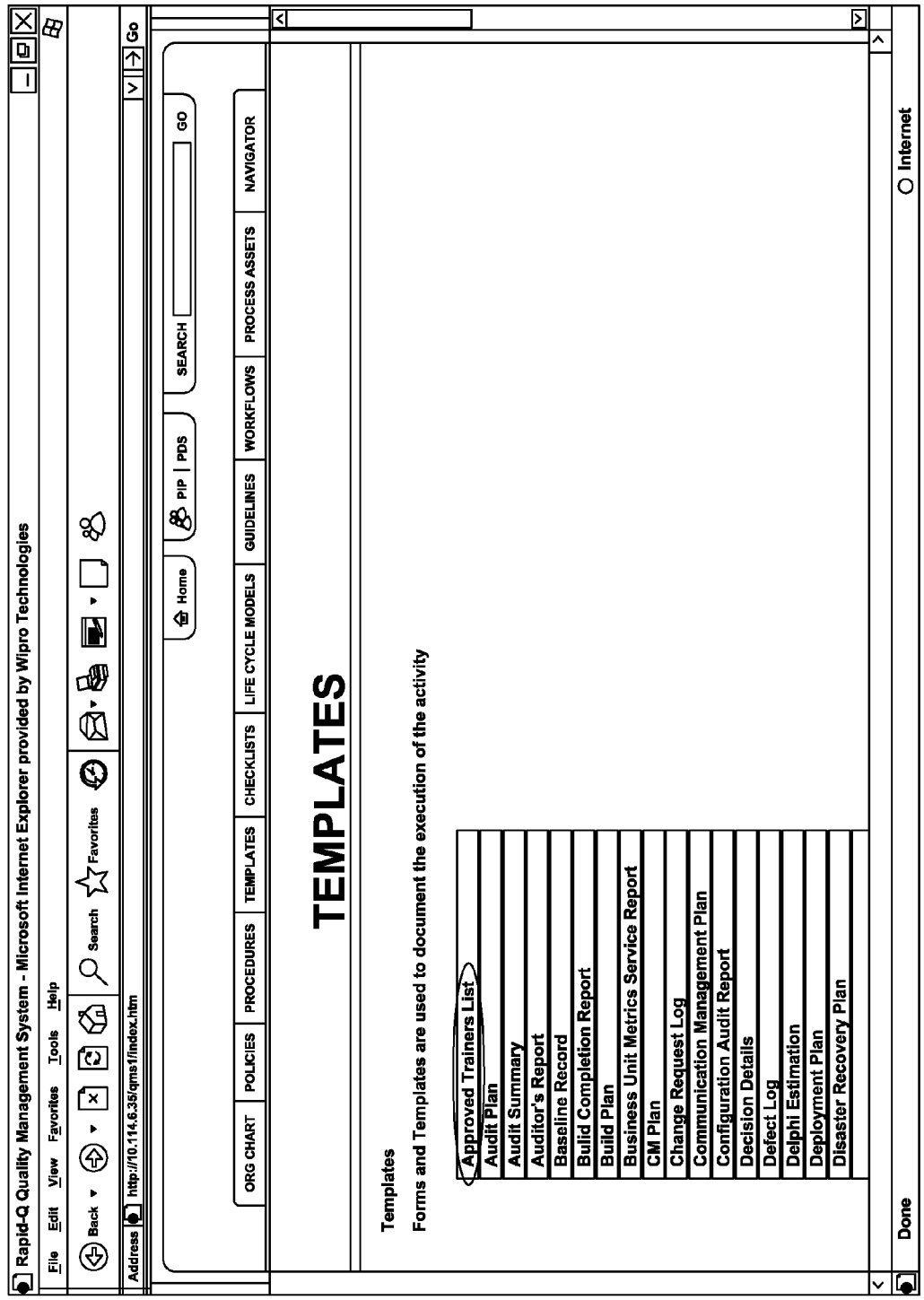
Figure 9:
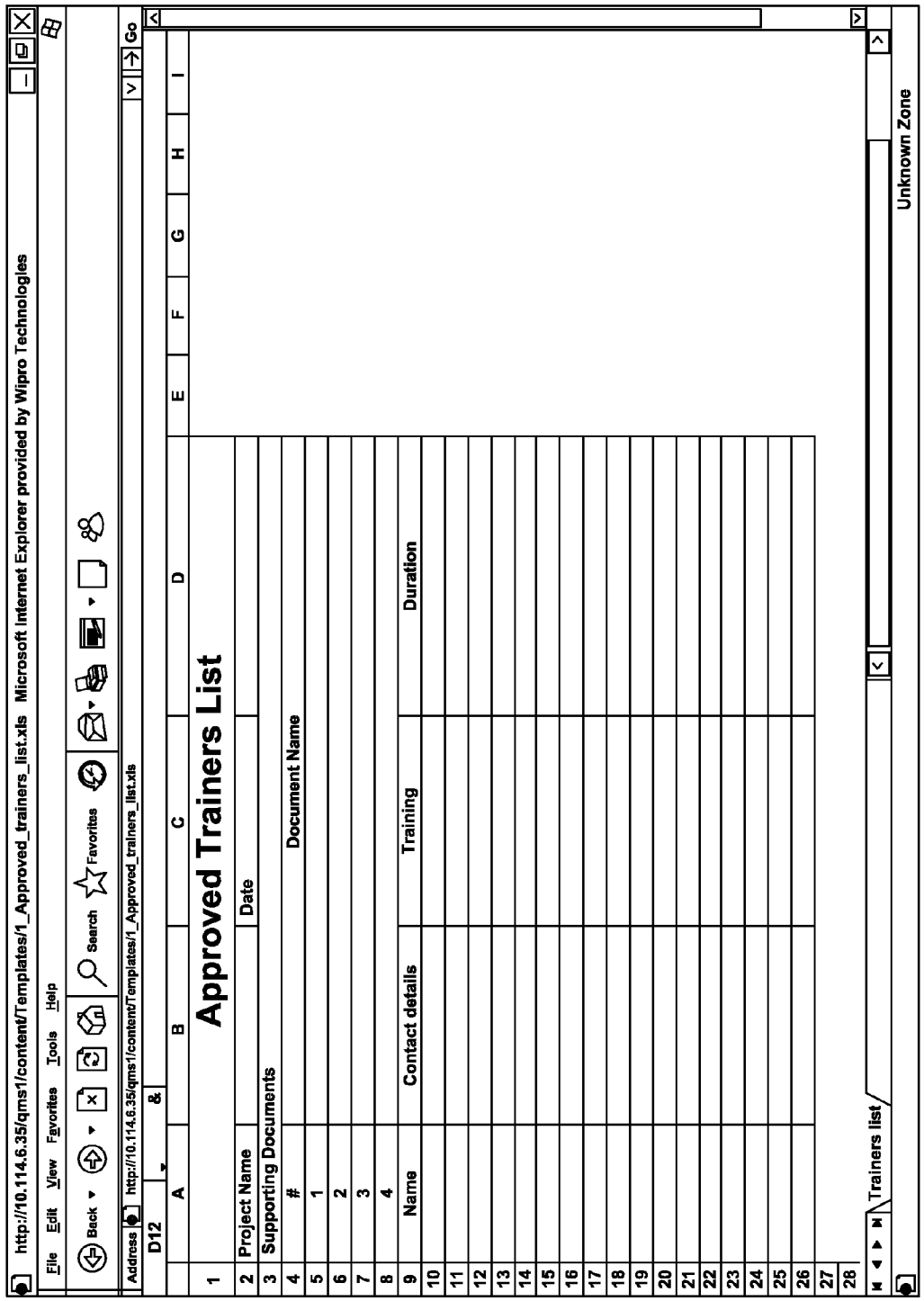

FIG. 8 shows the template depository 128 in more details. The template depository 128 includes items that described forms used to document the execution of activities during the lifecycle of the project. The forms included in the template depository 128 describe data that is required to be collected and represented. The collected data in the template depository 128 may be used by the procedure depository 122. Since the template depository 128 provides a fixed format for the data collection, therefore, the template depository 128 ensures that the data collected and represented remains the same and delivers the same information, irrespective of the person is entering the data. The template depository 128 may include a plurality of items, e.g., approved trainers list, audit plan, audit summary, auditors report, baseline record, build completion report, build plan business unit metrics service report, CM plan, change request log, communication management plan, configuration audit report, decision details defect log, Delphi estimation, deployment plan, disaster recovery plan etc. FIG. 9 shows an example of the item approved trainers list.

Figure 10:
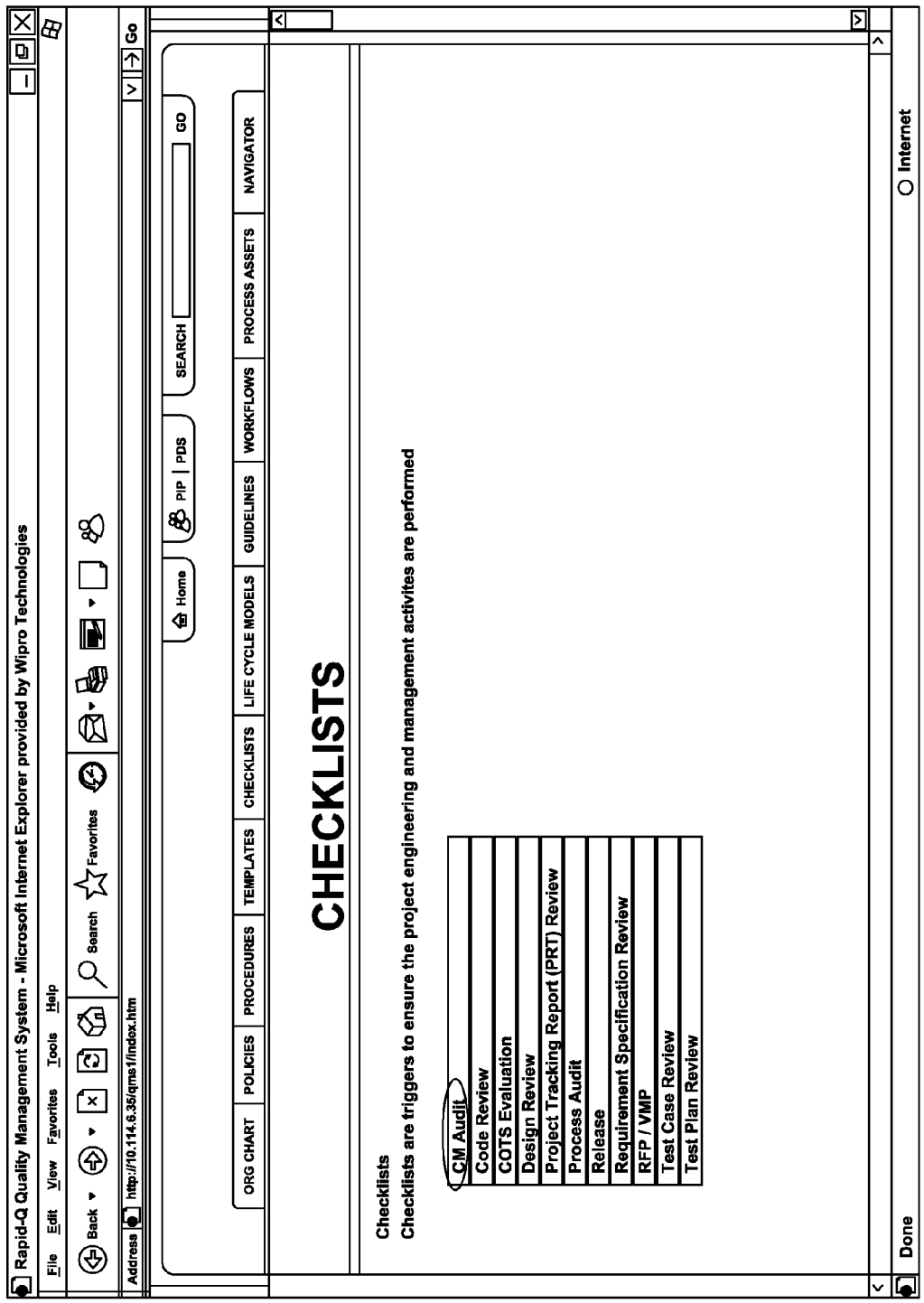
Figure 11:
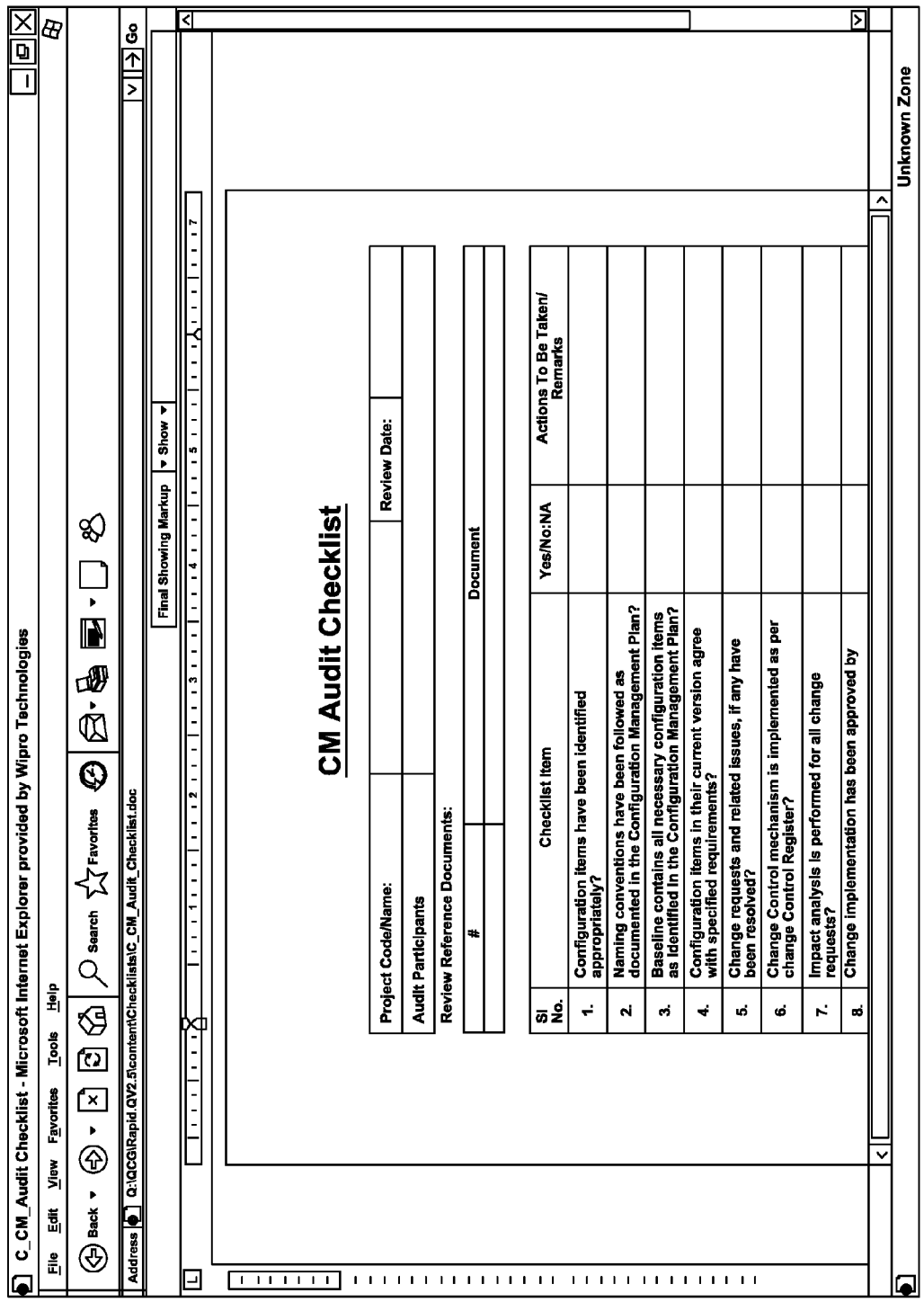

FIG. 10 shows the checklist depository 134 in more details. The checklist depository 134 includes items that are defined at the organization level to ensure that the project engineering and management activities are performed flawlessly. The checklist depository 134 serves the purpose of ensuring that all the activities listed in the items of the procedure depository 122 and the template depository 128 are performed correctly. A typical checklist depository 138 item includes a list of questions. A user of the system is expected to check each of the questions listed in the checklist depository 128. The checklist depository 128 may include a plurality of items, e.g., CM audit, code review, cost evaluation, design review, project tracking review, release and requirement specification review, RFT/VMP, test case review, test plan review etc. FIG. 11 shows an example of the item CM audit checklist.

Figure 12:
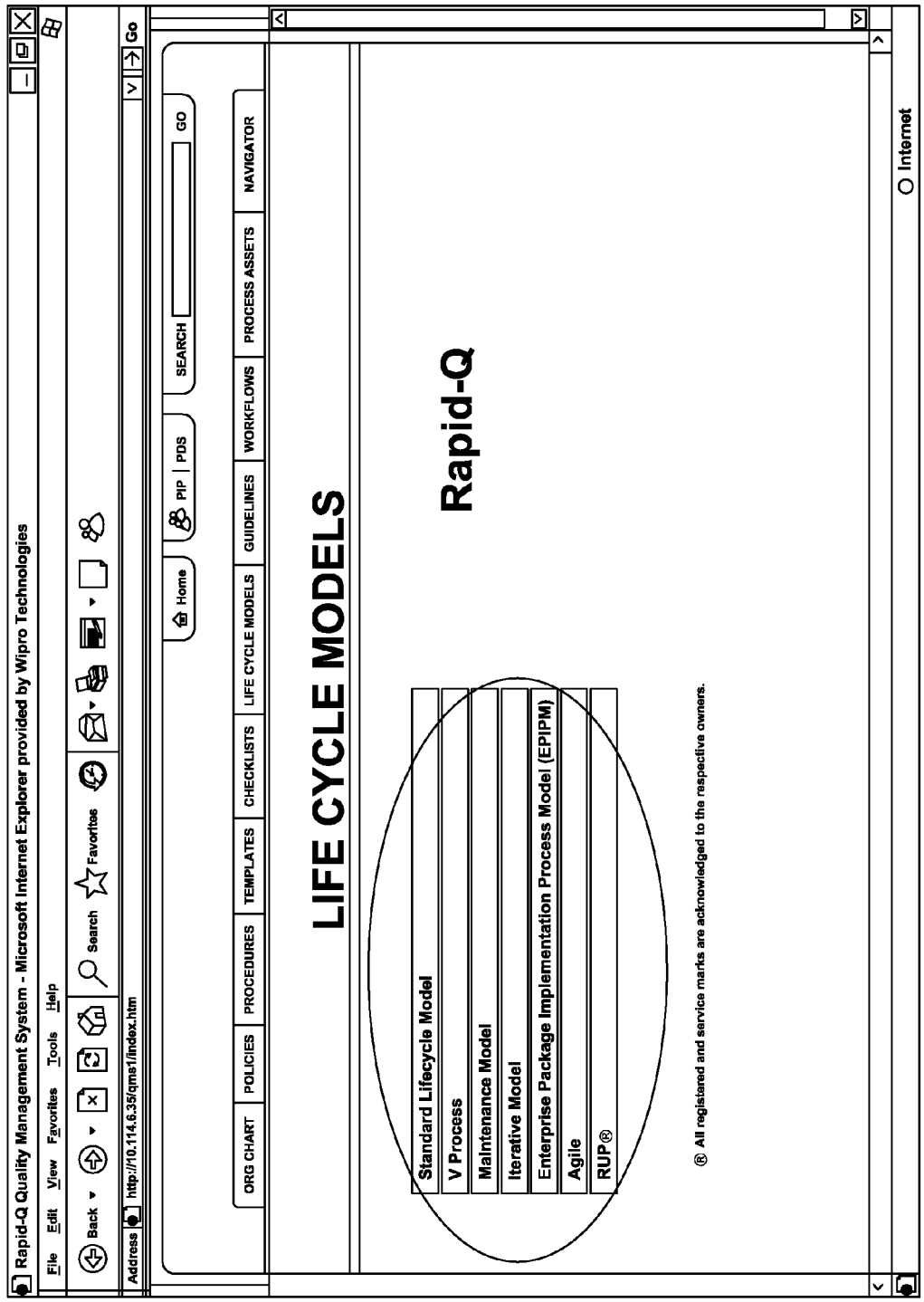
Figure 13:
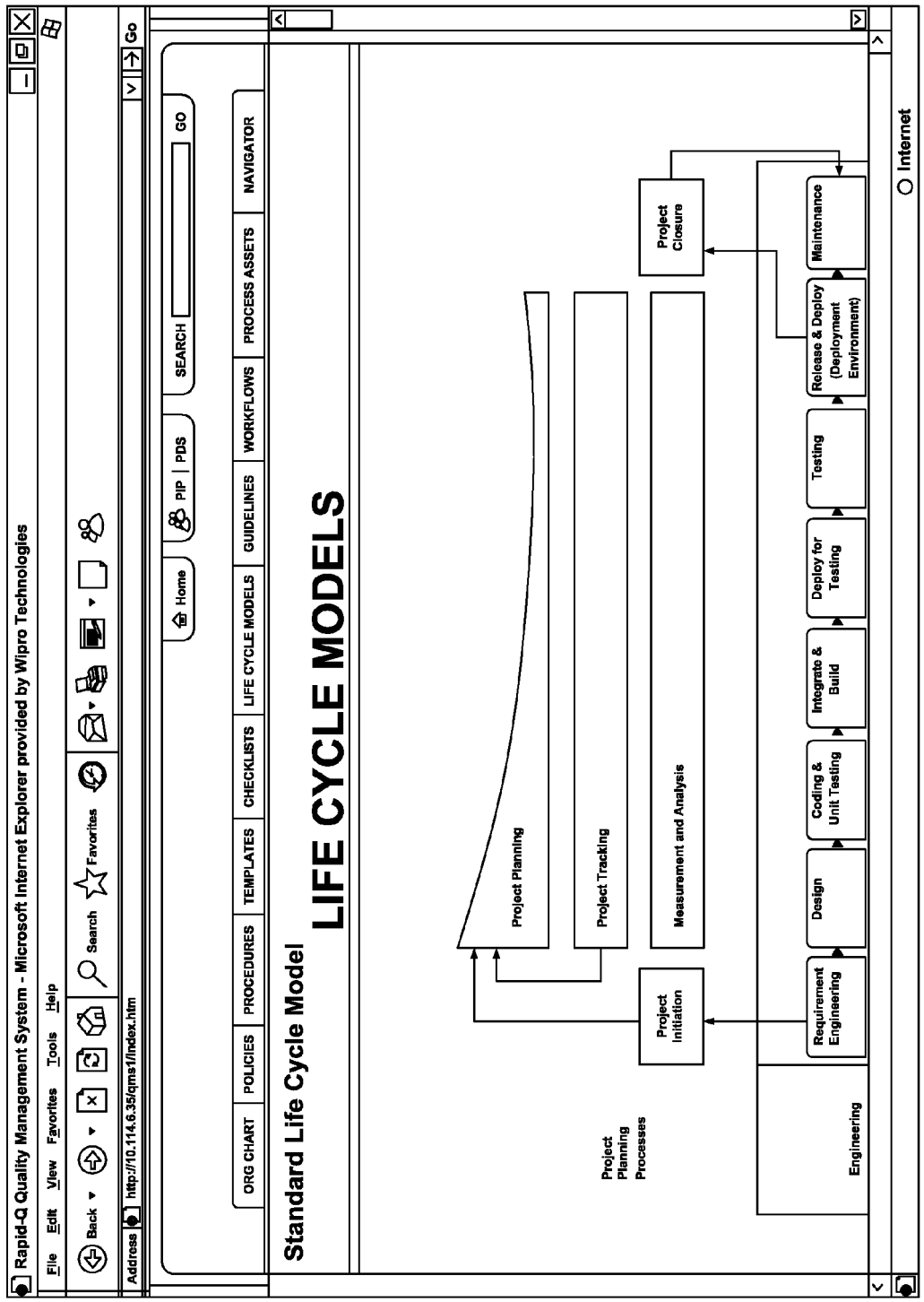

FIG. 12 shows the life cycle model depository 124 in more details. The life cycle model depository 124 includes items that are defined at the organization level. The items of life-cycle model depository 124 define sequence of activities that realized the software project from conceptual phase to deployment phase. According to the complexity of the project one of the life cycle models may be selected to implement this realization. The life cycle model depository 124 may include a plurality of items, e.g., standard lifecycle model, V process, maintenance model, enterprise package implementation process model, Agile model, RUP model. FIG. 13 shows an example of the standard life cycle model.

Figure 14:
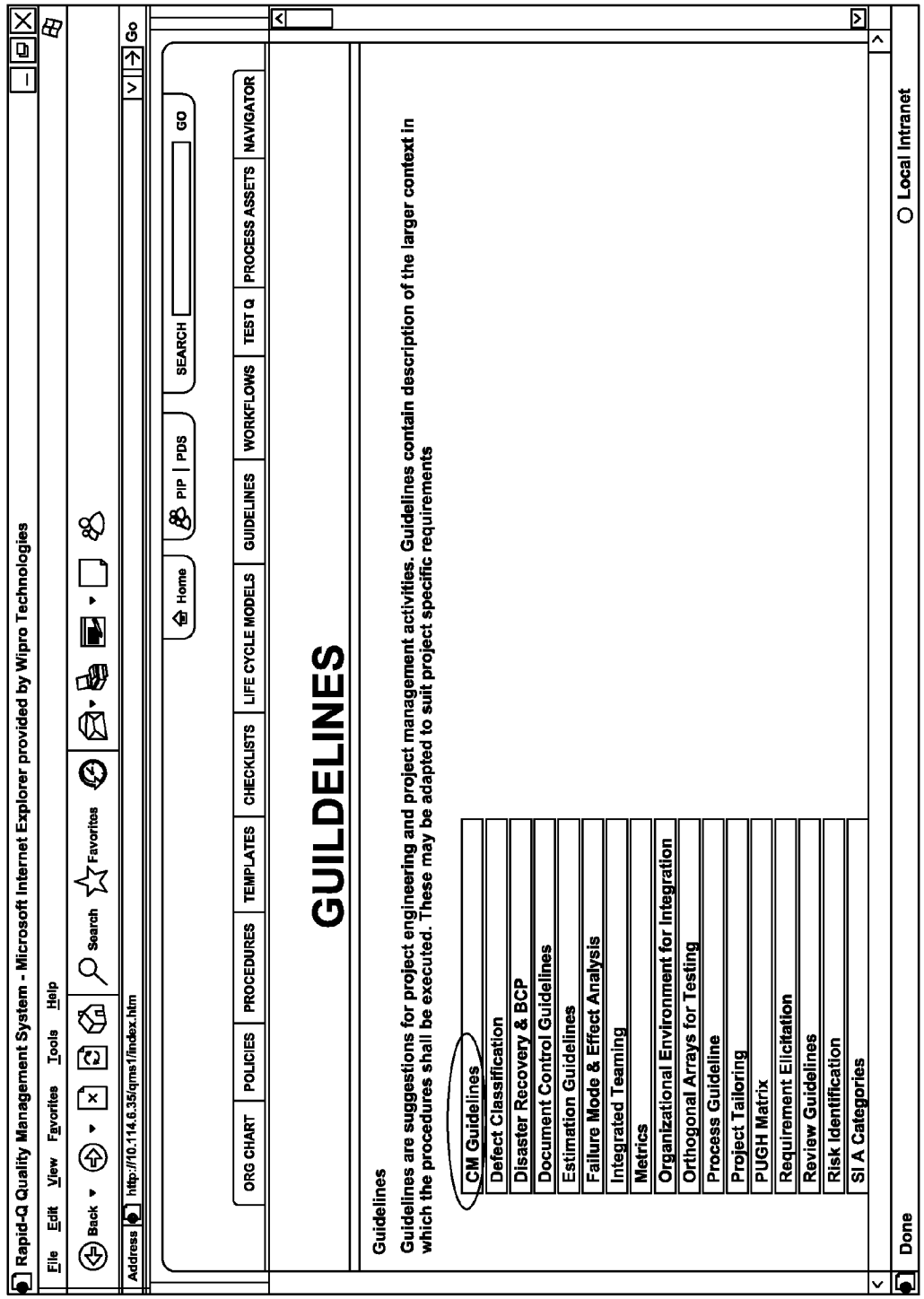
Figure 15:
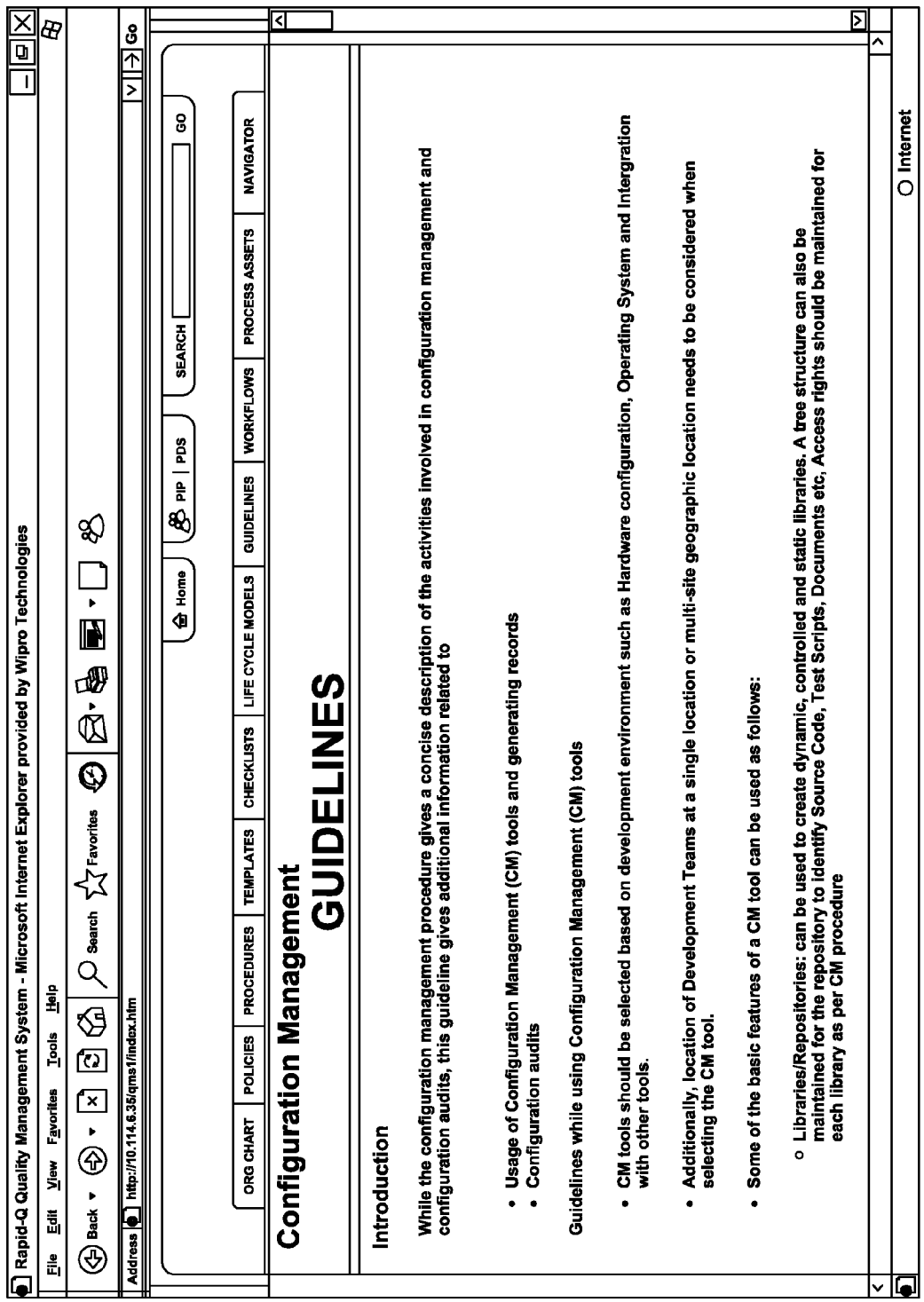

FIG. 14 shows the guideline depository 126 in more details. The guideline depository 126 includes items that describe the project engineering and project management activities. The guideline depository 126 provides inputs for performing activities of the project life cycle. The guideline depository 126 may include an expert advice and tips for performing activities effectively. The guideline depository 126 may include a plurality of items, e.g., CM guidelines, defect classification, disaster recovery and BCP, document control guidelines, estimation guidelines, failure mode and effect analysis, integrated teaming, metrics, organization environment for integration, orthogonal arrays for testing process guideline, project tailoring, IGJ matrix requirement elicitation, review guidelines, risk identification etc. FIG. 15 shows an example of the item of the guideline depository.

Figure 16:
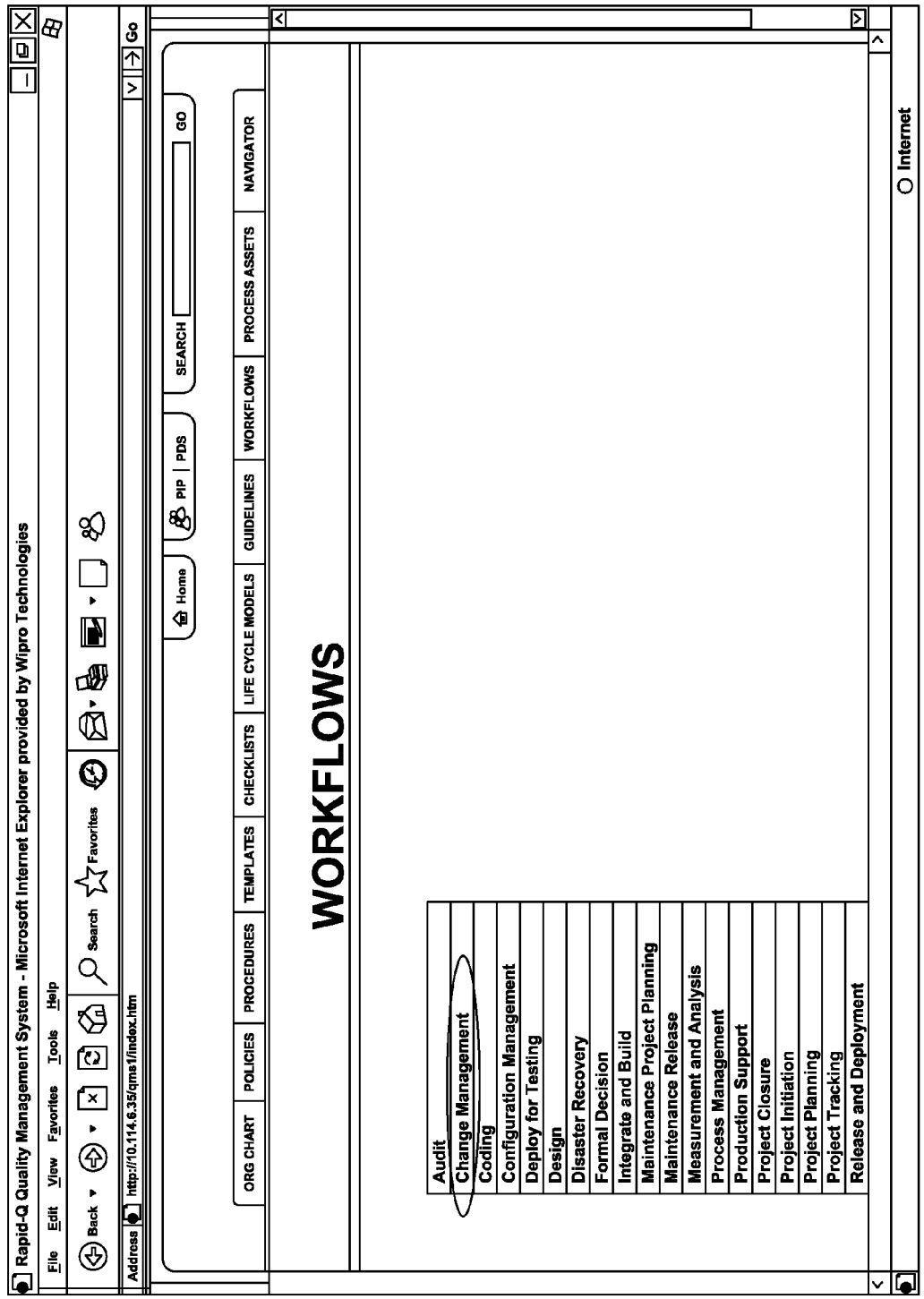
Figure 17:
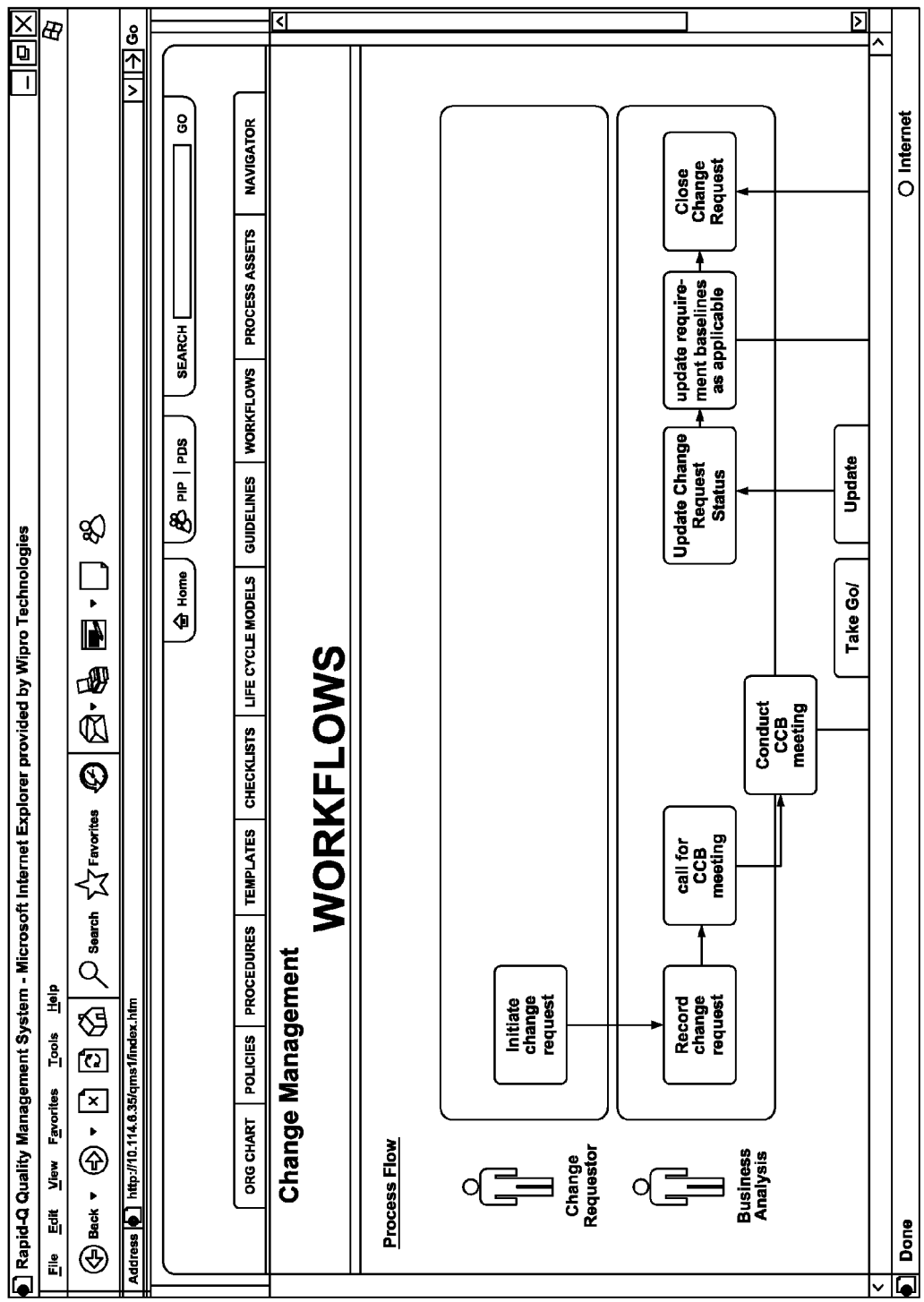

FIG. 16 shows the workflow diagram depository 132 in more details. The workflow diagram depository 132 includes items that are defined at the organization level. The workflow diagram depository 132 generates workflow diagram and make them available for accessing by the procedure depository 122. The workflow diagram depository 132 may generate workflow diagram according to change management, coding, configuration management, deploy for testing, design, disaster recovery, formal decision, integrated and build, maintenance project planning, measurement and analysis, process management, production support, project closure, projection initiation, project planning, project training, release and deployment etc. FIG. 17 shows an example of workflow diagram generated by the workflow diagram depository 132 according to change management.

Figure 18:
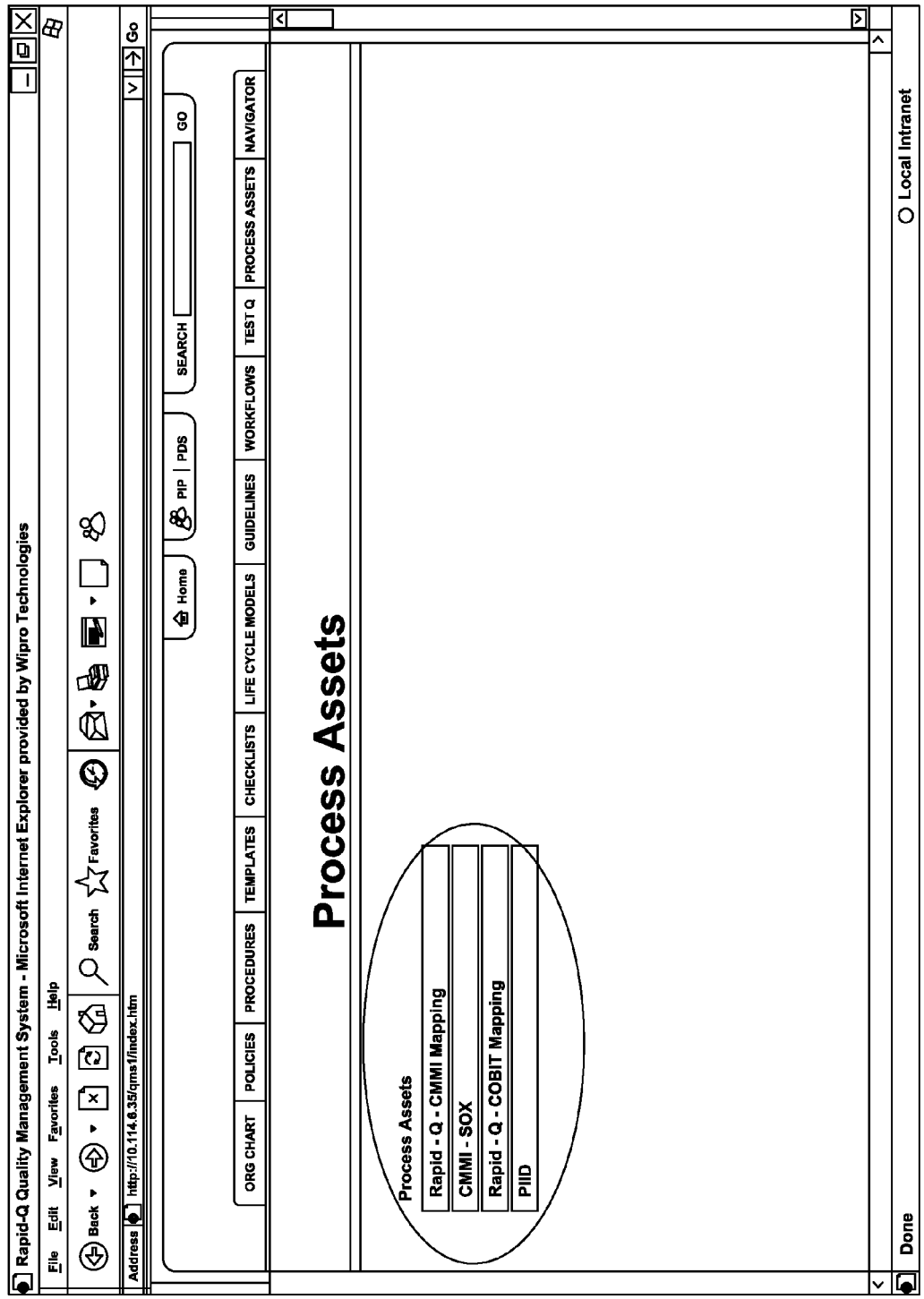
Figure 19:
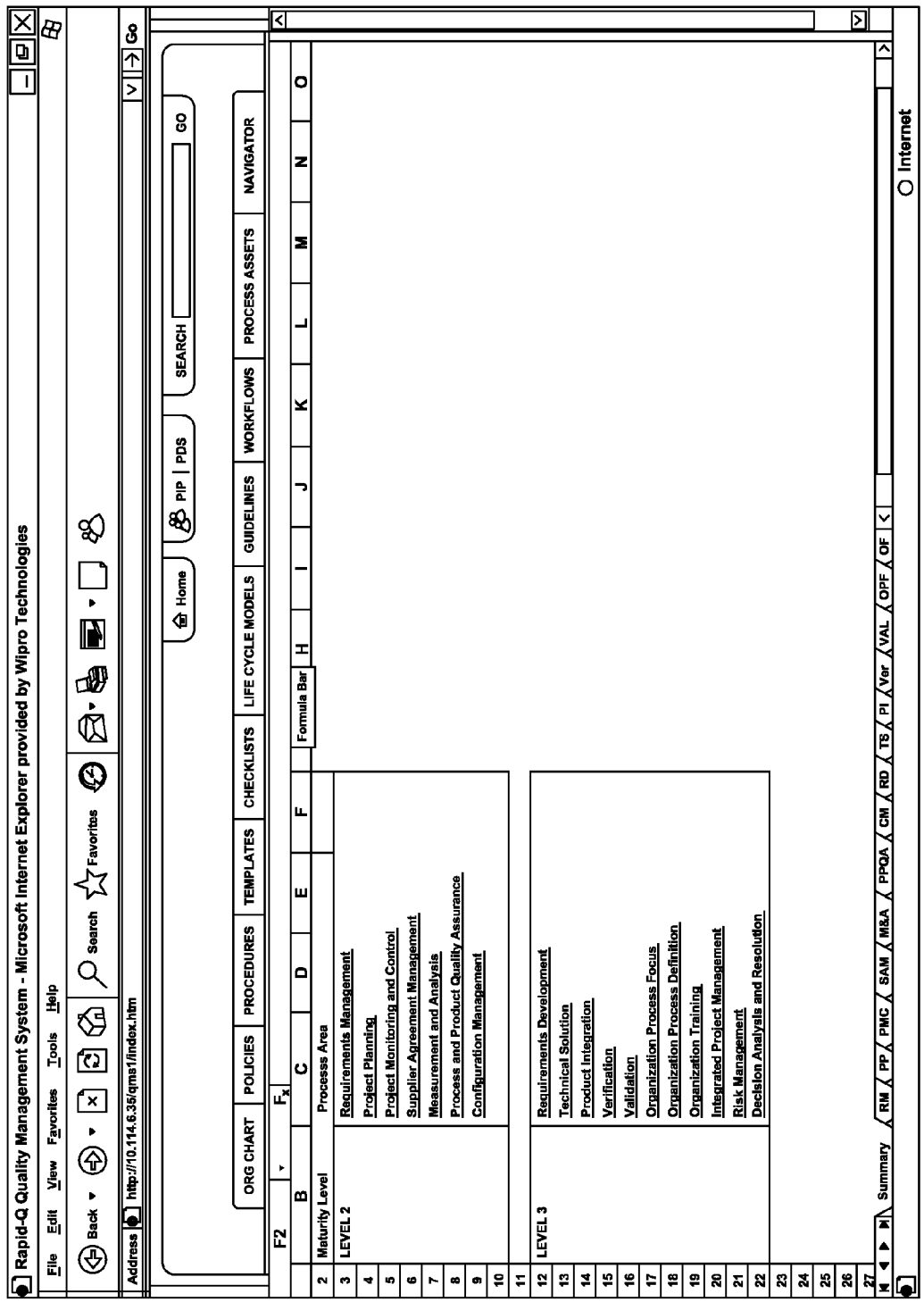
Figure 20:
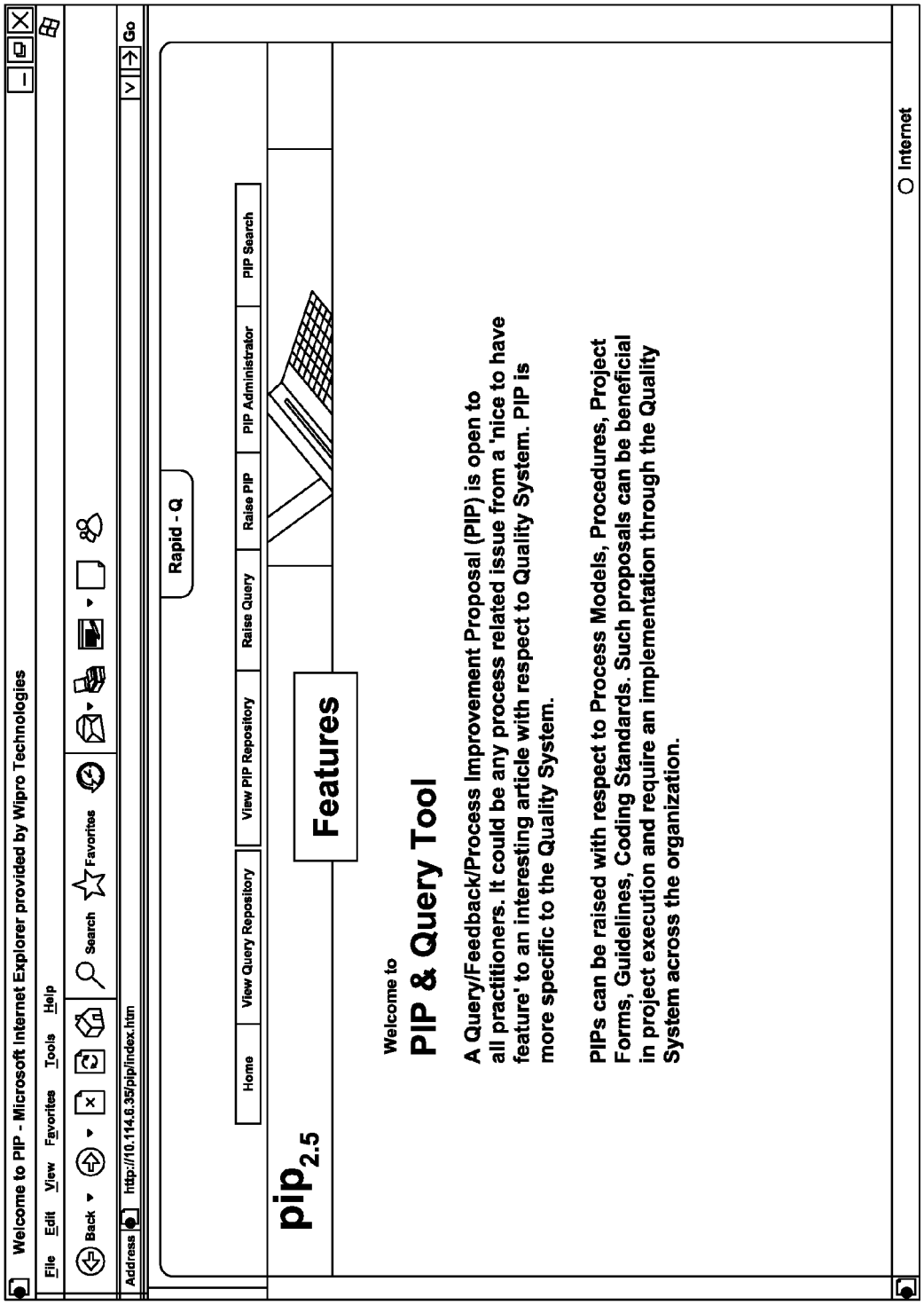

FIG. 18 shows the process asset depository 130 in more details. The process asset depository 130 includes items that are defined at the organization level. The process asset depository 130 contains information that is directly referred to or generated while defining and performing the management activities of the project. The project asset depository 130 may include a plurality of items, e.g., CMMI mapping, CMMI-SOX, COBIT mapping, PIIDCM etc. FIG. 19 shows an example of the item of this depository.

Figure 21:
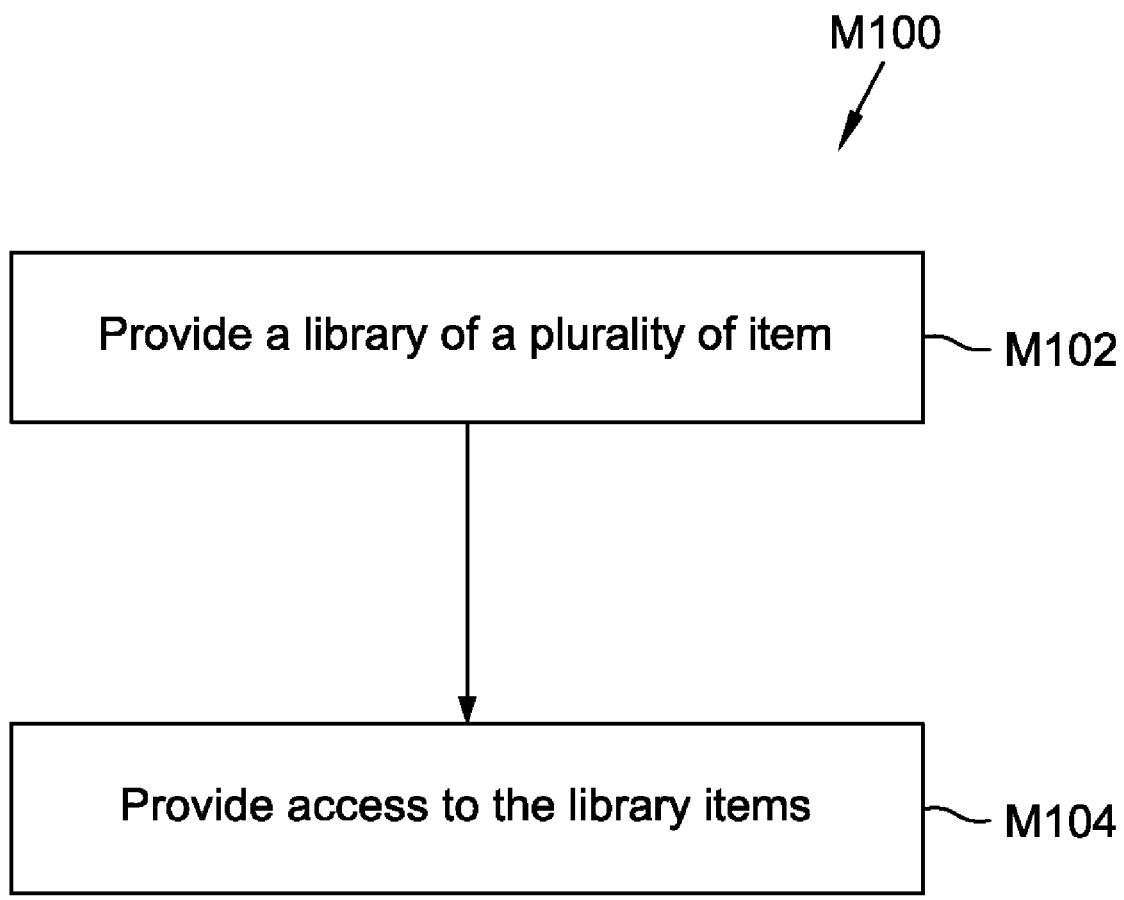
FIGS. 21-22 show the steps of the method according to present subject matter.

FIG. 21 shows a flow chart of a method M100 according present invention. The method M100 is provided for managing a software project lifecycle. The software project is defined by a series of lifecycle phases. Each of the life cycle phases is evaluated by one or more predetermined external standards. The method 100 is provided for and for determining one or more lifecycle phases that comply with the external standards of the software project are determined according to the entries of the system. The method 100 includes a plurality of steps. At first step M102 a library of a plurality of items is provided. Each of the items of the library is configured for receiving/providing a plurality of inputs/outputs. At step M104 access to the library is provided.

Figure 22:
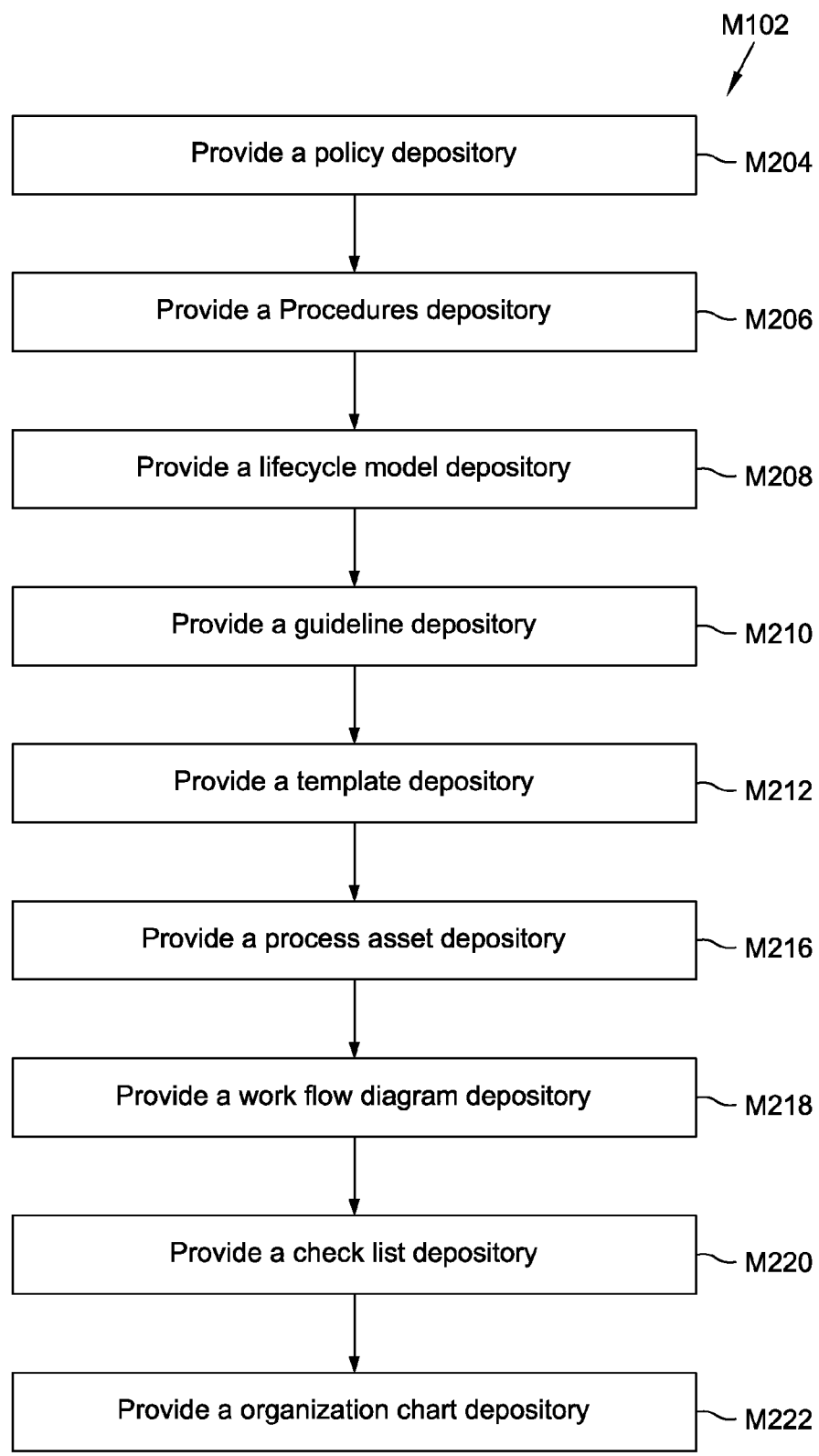

FIG. 22 shows the step M102 in more detail. The step of providing the library includes a step of providing a plurality of items. The step of providing plurality of items includes a step of M204 providing a policy depository. The policy depository includes a description of objectives of the organization and rules meeting those objectives. At step M206 a procedures depository is provided. The procedures in the procedures depository include steps that are required to perform to meet the objectives of the policies of the policy depository. At the step M208 a lifecycle model depository is provided. The life cycle model depository includes any software lifecycle model including V Process model, maintenance model, iterative model etc. At step M210 a guideline depository is provided. The guideline depository includes the guidelines include guidelines for executing processes during the software project lifecycle. At step M212 a templates depository is provided. The templates are provided with the system to include documentations required for execution of the processes. At step M216 a process asset depository is provided. The process assets depository includes one or more generalizable items for being utilized for the software project or any other software projects. At step M218 a workflow diagram depository is provided. The workflow diagram depository includes tools for including a work flow diagram. At step M220 a checklist depository is provided. The checklist depository includes a list of processes that are to be performed during the lifecycle of the software project. At step M222 an organization chart depository is provided.

According to another aspect of the invention a computer readable medium operable with a computer system is provided. The computer-readable medium is provided with a set of instructions for executing the method of the invention.

Although, the above example embodiments shown herein are explained with reference to an examples, the above-described technique is not limited to discussed example, but it can be applicable any software lifecycle project management. Further, although the embodiments of the present invention are described in the context of non-distributed environment they can be very much implemented in the distributed environment as well.

The above technique can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

The above description is intended to be illustrative, and not restrictive. Many other embodiments will be apparent to those skilled in the art. The scope of the subject matter should therefore be determined by the appended claims, along with the full scope of equivalents to which such claims are entitled. As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIGS. 20-23 can be performed in a different order from those shown and described herein.

All the FIGS. 1-23, illustrated herein are merely representational and are not drawn to scale. Certain proportions thereof may be exaggerated, while others may be minimized. The FIGS. 1-23, illustrate various embodiments of the subject matter that can be understood and appropriately carried out by those of ordinary skill in the art. In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A system comprising:
    a processor;
    a storage medium coupled to the processor; and
    a quality management framework stored in the storage medium and accessed by the processor for a software project lifecycle, the quality management framework comprising:
        a library of a plurality of items configured for receiving/providing a plurality of inputs/outputs; and the framework being configured for providing access to the items of the library for providing the lifecycle of the software project, which project is defined by a series of lifecycle phases, wherein each of the lifecycle phases is evaluated by one or more predetermined external standards, wherein the library of a plurality of items includes:
            a policy depository to provide a description of objectives for engineering and management activities pertaining to the software project and rules meeting the objectives;
            a procedures depository to provide procedures that are required to perform to meet the objectives of policies of the policy depository during the lifecycle of the software project and to generate a swim-lane diagram of the software project; and
            a guideline depository to provide guidelines for executing the engineering and management activities during the lifecycle of the software project expert's advice and tips for performing the engineering and management activities.

2. The system as claimed in claim 1, wherein the items of the library further include:
    a workflow diagram depository to provide a number of workflow diagrams during the software project lifecycle, wherein the procedures depository access the workflow diagrams during execution of the engineering and management activities;
    an organization chart depository;
    a lifecycle model depository to provide multiple standard software lifecycle models including V Process model, maintenance model, iterative model, enterprise package implementation process model, Agile model, and RUP model, wherein one of the standard software lifecycle models is selected to implement the sequence of the engineering and management activities from conceptual phase to deployment phase based on complexity and risk exposure of the software project;
    a templates depository to provide templates to document the execution of the engineering and management activities during the lifecycle of the software project; and
    a checklist depository to provide checklists that are defined at an organization level to ensure that the engineering and management activities pertaining to the software project are performed during the lifecycle of the software project.

3. The system as claimed in claim 2, wherein the lifecycle model depository is configured to include a modular interface that enables handling of the multiple standard software lifecycle models.

4. The system as claimed in claim 2, wherein the library further includes six sigma tools and techniques depository and a glossary depository.

5. The system as claimed in claim 1, wherein the procedures define steps to execute the engineering and management activities for application development and maintenance.

6. A method for implementing quality management framework for a software project lifecycle which project is defined by a series of lifecycle phases, wherein each of the lifecycle phases is evaluated by one or more predetermined external standards the method is provided for determining one or more lifecycle phases that comply with the external standards of the software project, the method comprising the steps of:

providing a library of a plurality of items in a storage medium for receiving/providing a plurality of inputs/outputs, wherein providing the library of a plurality of items includes:
  providing a policy depository including a description of objectives for engineering and management activities pertaining to the software project and rules meeting the objectives;
  providing a procedures depository including procedures that are required to perform to meet the objectives of policies of the policy depository during the lifecycle of the software project and to generate a swim-lane diagram of the software project; and
  providing a guideline depository including guidelines for executing the engineering and management activities during the lifecycle of the software project based on expert's advice and tips for performing the engineering and management activities; and
configuring the framework for providing access to the items of the library for providing the lifecycle of the software project, which project is defined by a series of lifecycle phases, wherein the framework being stored in the storage medium and accessed by a processor, and wherein each of the lifecycle phases is evaluated by one or more predetermined external standards.

7. The method as claimed in claim 6, wherein the step of providing the library of the plurality of items further includes the steps of:
  providing a lifecycle model depository including multiple standard software lifecycle models, the standard software lifecycle models include V Process model, maintenance model, iterative model, enterprise package implementation process model, Agile model, and RUP model, wherein one of the standard software lifecycle models is selected to implement the sequence of the engineering and management activities from conceptual phase to deployment phase based on complexity and risk exposure of the software project;
  providing a templates depository including templates to document the execution of the engineering and management activities during the lifecycle of the software project; and
  providing a checklist depository including checklists that are defined at an organization level to ensure that the engineering and management activities pertaining to the software project are performed during the lifecycle of the software project.

8. A non-transitory computer readable medium operable with a computer system, the computer-readable medium having stored thereon instructions operable with an architectural simulator environment supported by the computer system, the medium comprising: instructions for managing a software project lifecycle which project is defined by a series of lifecycle phases, wherein each of the lifecycle phases is evaluated by one or more predetermined external standards, the instructions are configured to execute a method, the method comprising the steps of:
  providing a library of a plurality of items configured for receiving/providing a plurality of inputs/outputs, wherein providing the library of a plurality of items includes:
    providing a policy depository including a description of objectives for engineering and management activities pertaining to the software project and rules meeting the objectives;
    providing a procedures depository including procedures that are required to perform to meet the objectives of policies of the policy depository during the lifecycle of the software project and to generate a swim-lane diagram of the software project; and
    providing a guideline depository including guidelines for executing the engineering and management activities during the lifecycle of the software project based on expert's advice and tips for performing the engineering and management activities;
  configuring the framework for providing access to the items of the library for providing the lifecycle of the software project, which project is defined by a series of lifecycle phases, wherein each of the lifecycle phases is evaluated by one or more predetermined external standards; and
  determining one or more lifecycle phases that comply with the external standards of the software project.

9. The non-transitory computer readable medium as claimed in claim 8, wherein providing the library of the plurality of items further includes:
  providing a lifecycle model depository including multiple standard software lifecycle models, the standard software lifecycle models include V Process model, maintenance model, iterative model, enterprise package implementation process model, Agile model, and RUP model, wherein one of the standard software lifecycle models is selected to implement the sequence of the engineering and management activities from conceptual phase to deployment phase based on complexity and risk exposure of the software project;
  providing a templates depository including templates to document the execution of the engineering and management activities during the lifecycle of the software project; and
  providing a checklist depository including checklists that are defined at an organization level to ensure that the engineering and management activities pertaining to the software project are performed during the lifecycle of the software project.

* * * * *